Patented Jan. 15, 1929.

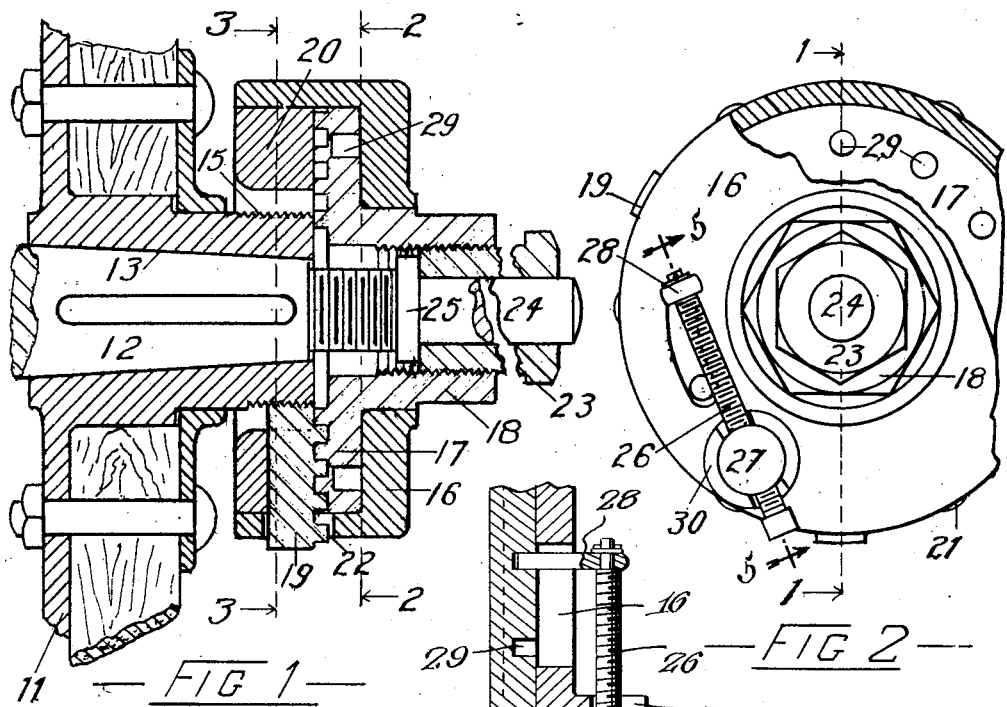
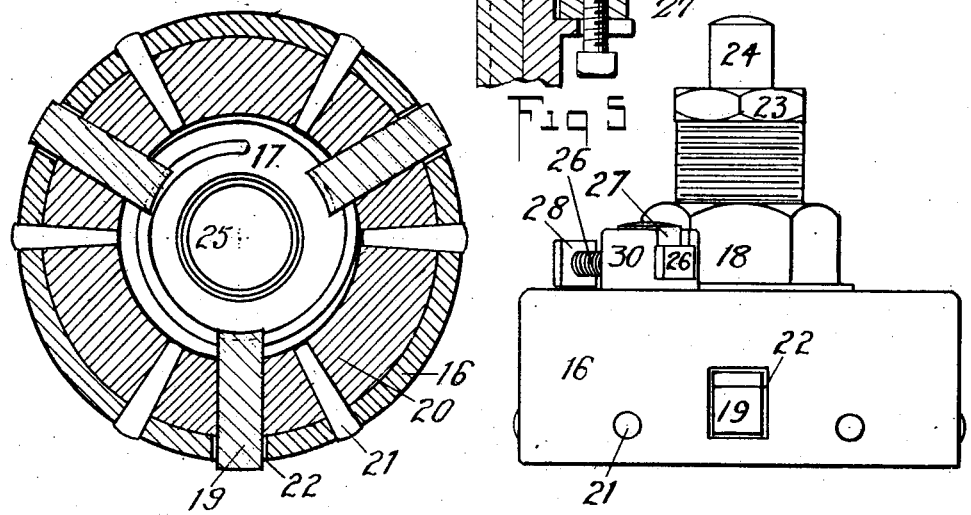

1,698,755

UNITED STATES PATENT OFFICE.

JOHN FREDERICK HOWARTH, OF MARRICKVILLE, NEAR SYDNEY, AUSTRALIA, ASSIGNOR OF ONE-HALF TO EDGAR MASON GOLDSMITH, OF NEW YORK, N. Y.

AUTOMOBILE WHEEL PULLER.

Application filed July 27, 1925. Serial No. 46,318.

This invention relates to an automobile wheel puller for removing the road wheels of automobiles from their axles.

The object of this invention is to provide a universal wheel puller by means of which wheels having varying diameter of screwed hubs and having screw threads of different pitches, may be removed from their axles.

A further object of the invention is to provide simple means for changing the clutch jaws to accommodate various pitches of screw threads.

A further object of the invention is to provide means whereby the shock of the hammer blows are prevented from being communicated to the screw threads of the hub of road wheel and the threads of the device.

A further object of the invention is to provide a means whereby the clutch mechanism may be given extra pressure, thereby forcing and holding the clutch jaws into the screw threads of wheel hub and also provide a means for releasing said clutch jaws to remove the device.

A further objection of the invention is to provide means for recutting the screw threads on hub of road wheels which have become damaged.

Fig. 1, is a sectional view on line 1—1 Fig. 2 of the device, as applied to the hub of an automobile road wheel showing the manner in which it is to be applied.

Fig. 2, is part broken section on line 2—2 Fig. 1 and part external view showing means for applying extra pressure.

Fig. 3, is a section on line 3—3 Fig. 1, showing means of securing clutch jaw guide in position.

Fig. 4, is an external view showing hexagon by means of which quick adjustment of clutch jaws is obtained; pressure screw, and housing which forms the buttress for swivel nut of clutch tightening screw.

Fig. 5 is a detail cross section approximately on the line 5—5 of Fig. 2.

The hub of an automobile road wheel is shown at 11, with its axle 12, within its bore 13, having a screw threaded portion 15, to which the wheel cap is fitted.

The body 16, forms a housing in which a spiral scroll plate 17, is rotatable by means of a wrench applied to hexagon 18, thereby causing the clutch jaws 19, simultaneously to advance to or recede from the center thus closing or opening the clutch mechanism. The clutch jaws 19, have lands which engage in spiral grooves of plate 17.

An annular ring 20, is secured within the housing 16, by means of taper pins 21, which extend thru the wall of the housing 16, and ring 20.

The ring 20, is radially grooved to form guide and support for clutch jaws 19, ports 22 being provided in housing 16, to allow jaws 19 to extend thru its walls.

The spiral grooved plate 17, is concentrically screwed to accommodate screw 23, which is bored to receive a free fitting plunger 24, with a head 25.

A means of applying heavy pressure on the clutch jaws 19, is provided by screw 26, pivoted nut 27, swivel 28, which engages holes 29, in back of spiral grooved, plate 17. Nut 27 is free to oscillate in cup 30, in order to follow the swivel 28, in its arcuate movement. The said swivel, pivot nut, and screw may be lifted out when extreme tightness of clutch jaws is unnecessary.

The manner in which this device is to be used is as follows:

The dust cap is removed from the automobile road wheel exposing the thread 15, and the nut removed from the threaded extension of axle.

Pressure screw 23, is either removed or screwed well back, preferably removed. The device is operated by means of a wrench on hexagon 18, which rotates spirally grooved plate 17, opening clutch jaws 19. The device is then placed on the screwed hub 15, and jaws closed tightly by rotating plate 17, thus engaging the screwed hub with the screwed ends of clutch jaws 19.

By looking thru center hole from which the pressure screw has been removed, the end of axle 12, may be seen, and should the threads of clutch jaws be "crossed" the axle 12, would not be concentric.

The pressure screw 23, and plunger 24, are then replaced and the screw pressure applied, which will often be sufficient to remove a wheel, but should the wheel be extremely tight, it will be necessary to strike the end of plunger 24, with the hammer at the same time maintaining a pressure with screw 23, which is sufficient to remove any but a seized wheel.

By this construction the force of the hammer blows are communicated direct to the axle and not to the threads of pressure screw or wheel hub.

When desired to apply extra pressure to the clutch jaws 19, the assembly shown in screw 26, swivel nut 27, pivot 28, holes 29 in back of spiral grooved plate 17, and housing for pivot nut 30 is used. This assembly is placed in position and pressure exerted by means of screw 26, and when desired is released by unscrewing.

In this device I prefer and have designed the device with three clutch jaws, as this construction accommodates itself to any inequality of either the clutch mechanism or the wheel hub.

Having thus described my said invention and the manner in which it is to be applied, what I claim is:

1. An automobile wheel puller comprising a hollow body having in one end an opening for receiving the hub of the wheel to be pulled, together with the end portion of the wheel supporting spindle projecting beyond the hub, a plurality of radially slidable jaws disposed within the body, means extending through the opposite end portion of the body and connected to the jaws for operating the same to move into and out of engagement with the hub when the same is arranged within the body, and means extending through the last named end portion of the body responsive to manipulation with a tool to impinge upon the projecting end portion of the spindle when the jaws engage the hub and thereby effect outward displacement of the hub from the spindle.

2. An automobile wheel puller comprising a hollow body having in one end an opening for receiving the hub of the wheel to be pulled, together with the end portion of the wheel supporting spindle projecting beyond the hub, a plurality of radially slidable jaws disposed within the body, means extending through the body and connected to the jaws for operating the same to move into and out of engagement with the hub when the same is arranged within the body and means extending through the jaw operating means responsive to manipulation with a tool from the exterior of the body to impinge upon the projecting end portion of the spindle when the jaws engage the hub, and thereby effect outward displacement of the hub from the spindle.

3. An automobile wheel puller comprising a hollow body having in one end an opening for receiving the hub of the wheel to be pulled, together with the end portion of the wheel supporting spindle projecting beyond the hub, and further having a plurality of peripherally disposed recesses, a plurality of radially slidable jaws disposed within the body and extending into the recesses thereof, a turnable member disposed within the body and having a portion extending through the opposite end thereof adapted for allowing the member to be turned manually, said jaws and turnable member having engaging structures cooperating when the member is turned in one direction to move the jaws inwardly into engagement with the hub when the same is within the body, said engaging structures being adapted when the member is turned in the opposite direction to move the jaws outwardly through the recesses and then disengage from one another to permit removal of the jaws from the body, and means carried by the body responsive to manipulation with a tool to impinge upon the projecting end portion of the spindle when the jaws engage the hub and thereby effect outward displacement of the hub from the spindle.

4. An automobile wheel puller comprising a hollow body having in one end an opening for receiving the hub of the wheel to be pulled, together with the end portion of the wheel supporting spindle projecting beyond the hub, a plurality of radially slidable jaws disposed within the body, means extending through the opposite end portion of the body and connected to the jaws for operating the same to move into and out of engagement with the hub when the same is arranged within the body, and means screwed into the body and responsive to manipulation with a tool to impinge upon the projecting end portion of the spindle when the jaws engage the hub and thereby effect outward displacement of the hub from the spindle.

5. An automobile wheel puller comprising a hollow body having in one end an opening for receiving the hub of the wheel to be pulled, together with the end portion of the wheel supporting spindle projecting beyond the hub, a plurality of radially slidable jaws disposed within the body, means extending through the opposite end portion of the body and connected to the jaws for operating the same to move into and out of engagement with the hub when the same is arranged within the body, and means extending through the last named end portion of the body responsive to manipulation with a tool to impinge upon the projecting end portion of the spindle when the jaws engage the hub and thereby effect outward displacement of the hub from the spindle, said last named means including a member screwed into the body and a plunger slidable within the member.

JOHN FREDERICK HOWARTH.